Figure 1:
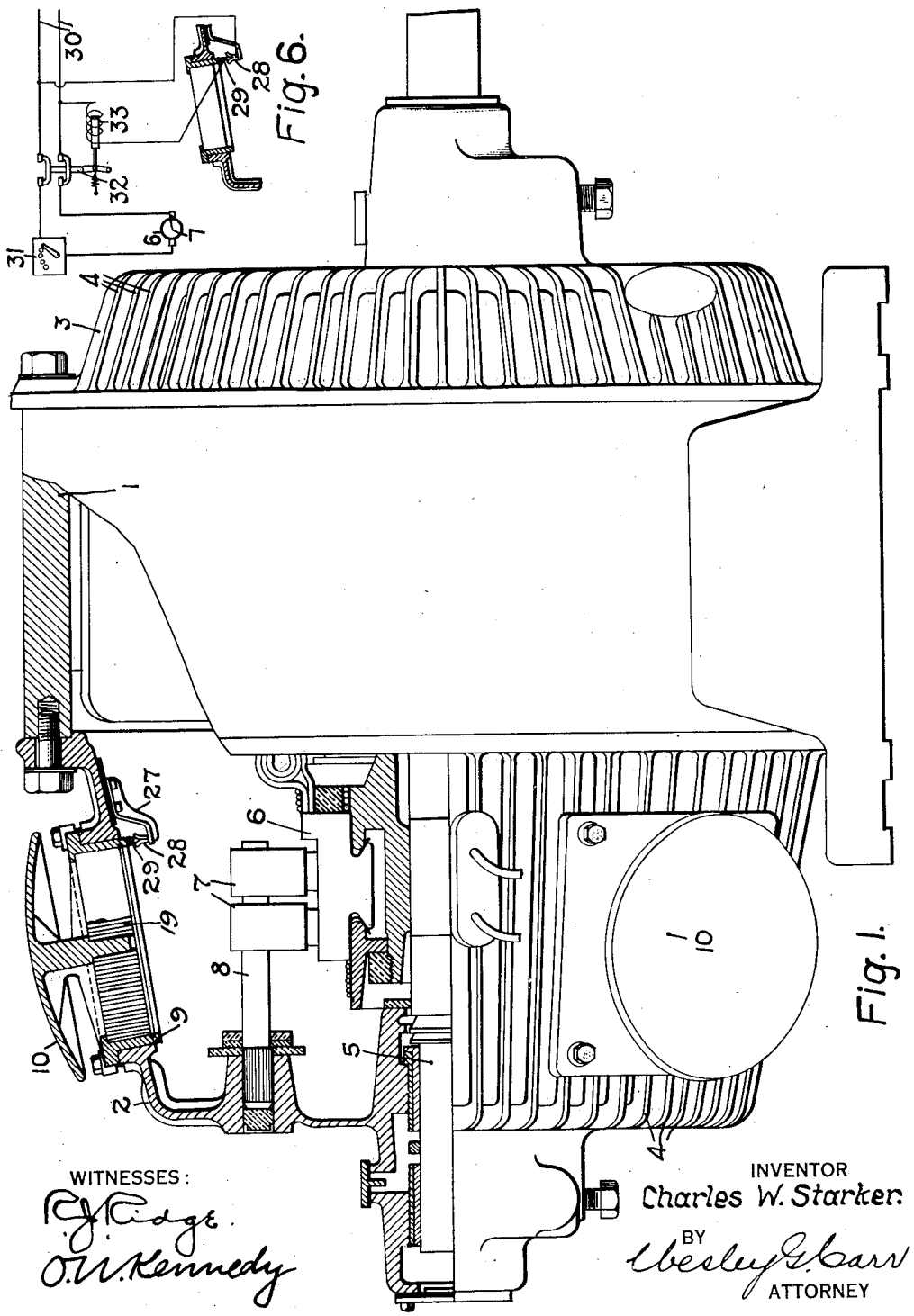

C. W. STARKER.
EXPLOSION PROOF DEVICE FOR ELECTRICAL APPARATUS.
APPLICATION FILED AUG. 30, 1916.
1,362,049.
Patented Dec. 14, 1920.
2 SHEETS—SHEET 2.
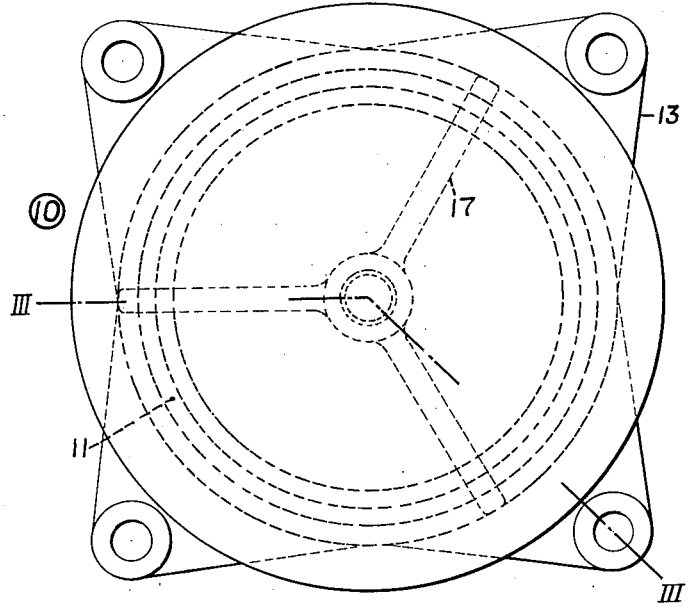
Fig. 2.
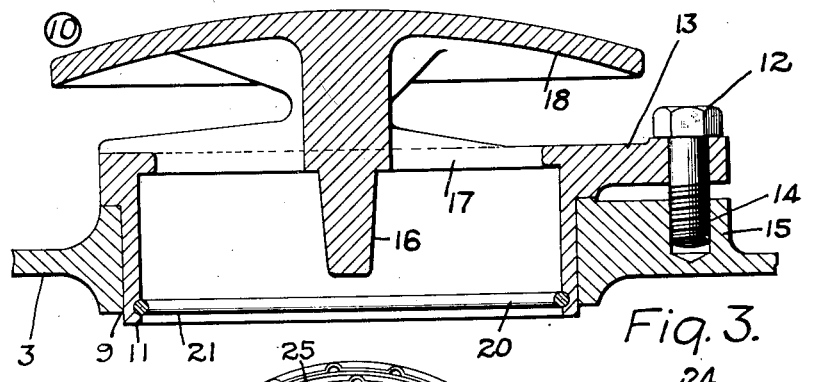
Fig. 3.
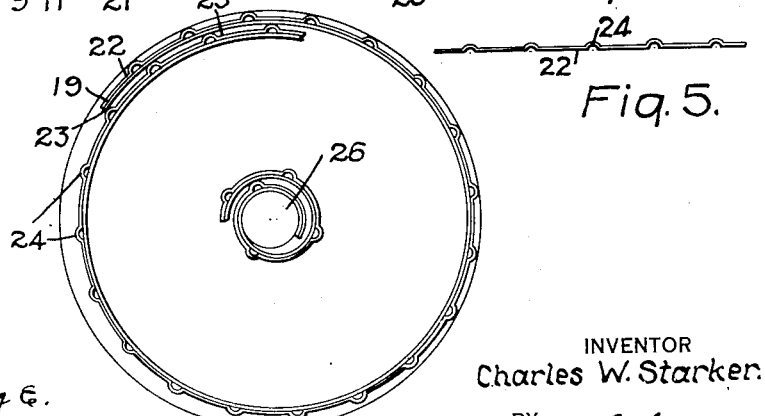
Fig. 5.
Fig. 4.
WITNESSES:
INVENTOR
Charles W. Starker.
BY
Wesley G. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

EXPLOSION-PROOF DEVICE FOR ELECTRICAL APPARATUS.

1,362,049. Specification of Letters Patent. Patented Dec. 14, 1920.

Application filed August 30, 1916. Serial No. 117,778.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Explosion-Proof Devices for Electrical Apparatus, of which the following is a specification.

My invention relates to explosion-proof devices for electrical apparatus, such as electric motors, control apparatus and storage batteries that are operated in coal mines, tunnels, submarine boats or in similar locations where readily inflammable mixtures of explosive gases are present. The object of my invention is to provide a device that will permit electrical apparatus to be operated in such locations without danger of explosions.

It is well known that electric motors and control apparatus, even when provided with so-called "air-tight" casings, cannot be safely operated in gaseous locations, for the reason that an appreciable amount of gas will find its way within the casings. When a sufficient quantity of gas has collected within the casing to form an explosive mixture therein, a spark from the current-carrying portions of the apparatus will cause an explosion. Inasmuch as the casing is approximately air tight, the sudden increase in pressure following such an explosion usually causes rupture of the casing at some point and the burning gases then escape into the surrounding atmosphere. If sufficient quantities of gas are present in the atmosphere, a second and more disastrous explosion is unavoidable.

According to the present invention, I provide a motor or other electrical apparatus of the so-called "air-tight" type with an auxiliary device that will relieve the increase in pressure following an explosion within the casing and will cool the expanding gases below the ignition point before permitting any of them to escape into the surrounding gaseous atmosphere. I further provide an arrangement that will prevent the apparatus from being operated in the absence of my device.

In the accompanying drawings, Figure 1 is a view, partially in section and partially in side elevation, of a motor provided with an explosion-proof device constructed in accordance with my invention; Fig. 2 is a plan view of one of the explosion-proof devices shown in Fig. 1; Fig. 3 is a sectional view along the line III—III of Fig. 2 and showing a portion of the motor casing. Figs. 4 and 5 are detail views of a portion of the explosion-proof device, and Fig. 6 is a diagrammatic view showing a portion of the circuit connections of the motor shown in Fig. 1, with relation to my device.

The motor shown in Fig. 1 comprises a frame 1 to which are attached air-tight end casings 2 and 3 that are respectively provided with substantially longitudinal ribs 4 which are adapted to assist in dissipating the heat from the motor. The motor further comprises a rotatably mounted armature shaft 5 that carries a commutator cylinder 6. Suitable current-collecting devices 7 are mounted on rods 8 carried by the casing 2 and are adapted to coact with the commutator cylinder 6. The casing 2 is provided with substantially circular openings 9 within which are located one or more explosion-proof devices 10.

Referring now to Figs. 2 and 3, each device 10 comprises a hollow cylindrical portion 11 of substantially the same outside diameter as the opening 9. The device 10 is secured within the opening 9 by means of bolts 12 coacting with projections 13 that are provided around the periphery of the portion 11 and with threaded openings 14 that are provided in a flange 15 surrounding the opening 9. The device 10 further comprises a tapered lug 16 that is centrally supported within the portion 11 by means of radial ribs 17. The ribs 17 further support a curved shield 18 that is substantially circular in form and is of greater outside diameter than the portion 11. A coil 19 is supported within the portion 11 by the ribs 17 and is secured therein by means of a retaining ring 20 coacting with a groove 21 provided on the inner periphery of the portion 11. As best shown in Figs. 4 and 5, the coil 19 is preferably formed of parallel straps 22 and 23 of ductile material, the outer strap 22 being provided with crimps or corrugations 24 which provide spaces 25 between adjacent convolutions of the coil. It is to be understood that the strap 22 may be formed without the crimps 24 but that suitable spacers may be placed between the straps 22 and 23 to provide the spaces 25. The straps are wound about a suitable mandrel so that a central opening 26 is formed for the reception of the lug 16.

From the foregoing, it is apparent that any sudden increase in pressure, following an explosion within the casing 2, will be quickly relieved by the escape of the expanding gases through the spaces 25 in the coil 19. The passage of the gas through the spaces 25 will cool it below the ignition point so that no burning gases will be emitted from the casing 2. If desired, the strap 23 may be replaced by gauze in order to increase the cooling effect and to break up the gases. The shield 18 protects the coil 19 from material falling from the roof of the mine chamber or from any other external source and also tends to prevent dust and dirt from obstructing the openings 20 and thereby impairing the effectiveness of the explosion-proof device 10. Furthermore, the device 10 may be readily removed from the casing 2 for inspection and in order to remove any foreign matter that may lodge in the spaces 25.

Referring again to Fig. 1, the casing 2 is provided with a contact arm 27 that is insulated therefrom and is provided with resilient contact fingers 28. The portion 11 is provided with a contact member 29 so located that, when the device 10 is placed within the opening 9, the member 29 is forced between the fingers 28. As best shown in Fig. 6, the commutator cylinder 6 of the motor is connected to supply mains 30 through a starting device 31. A suitable circuit-controlling device 32, such as a circuit breaker, is interposed between the motor and the mains 30 and is provided with a no-voltage release coil 33. One terminal of the coil 33 is connected to one main 30 and the other terminal is connected to the other main 30 through the coacting contact members 28 and 29. When the circuit breaker 32 is closed, it will be maintained in that position while the coil 33 is energized from the mains 30. If, for any reason, the contact members 28 and 29 are disengaged, the deënergization of the coil 33 actuates the tripping mechanism of the circuit breaker 32, thereby disconnecting the motor from the mains 30. Thus, it will be impossible to operate the motor if any of the explosion-proof devices are removed from the casing.

While I have shown my invention in its preferred form, it is not so limited but is susceptible of various minor changes and modifications within the scope of the appended claims.

I claim as my invention:

1. The combination with a source of electrical energy, a dynamo-electric machine connected thereto, and a casing inclosing the current-carrying parts of said machine of a contact member mounted on said casing, and an explosion-proof device provided with a coöperating contact member and detachably secured to said casing, the removal of which disconnects said machine from said source.

2. The combination with a dynamo-electric machine, a casing inclosing the current-carrying parts of said machine, of an explosion-proof device carried by said casing, said casing and said device being provided with contact members which are normally in engagement and which are disengaged when said device is removed from said casing.

3. In a dynamo-electric machine, a casing inclosing the current-carrying parts of said machine and provided with openings therein, ventilating devices disposed within said openings, and coöperating switching members mounted on the said casing and the said ventilating devices whereby the circuit to the current-carrying parts of said machine is broken when any of said ventilating devices is removed from the casing.

In testimony whereof, I have hereunto subscribed my name this 22d day of August 1916.

CHARLES W. STARKER.